Sept. 4, 1956   J. T. FRATER   2,761,640
ADJUSTABLE CHALKBOARD MOUNTING
Filed Jan. 18, 1952
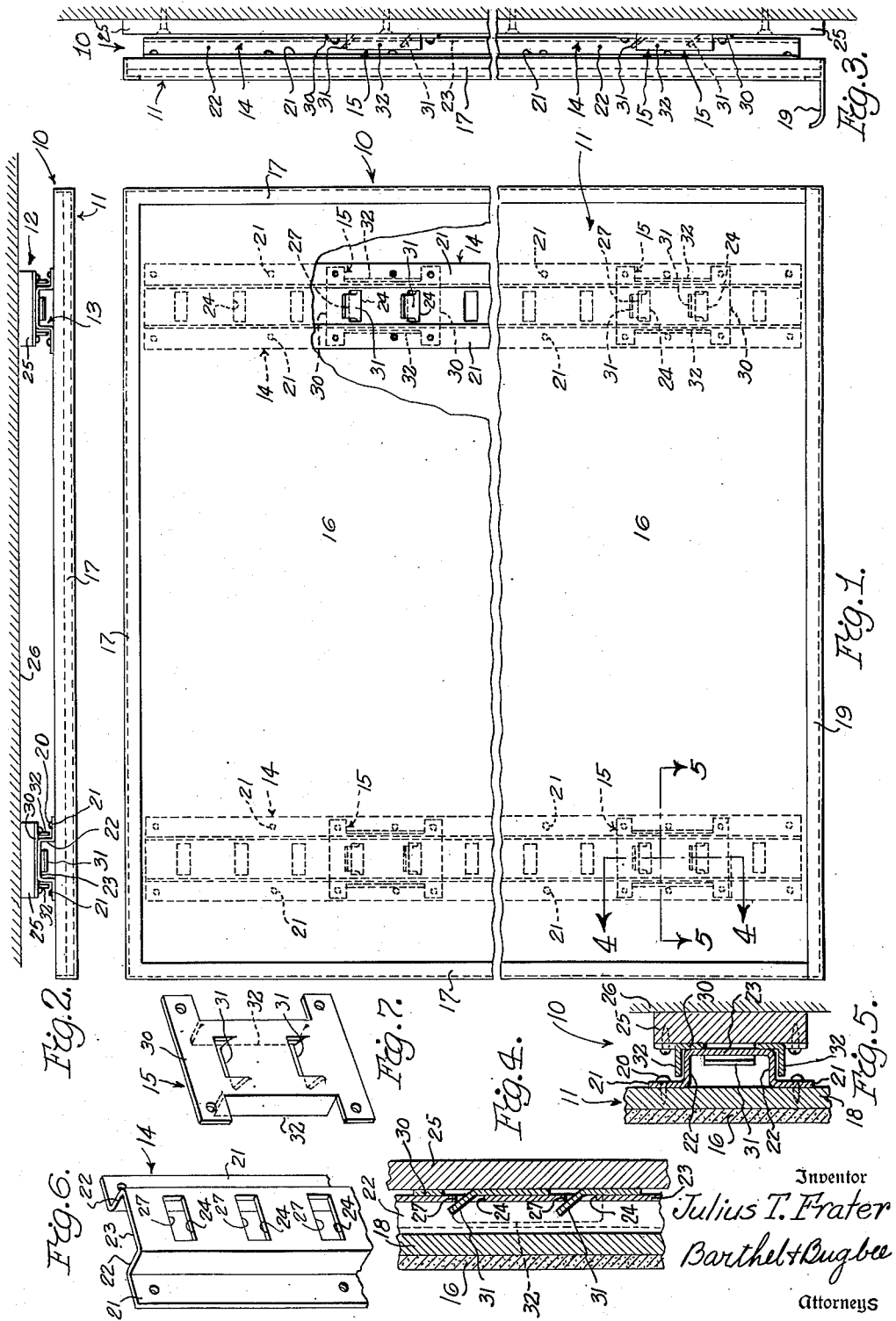
Inventor
Julius T. Frater
Barthel & Bugbee
Attorneys

United States Patent Office 2,761,640
Patented Sept. 4, 1956

2,761,640

ADJUSTABLE CHALKBOARD MOUNTING

Julius T. Frater, Grosse Pointe Woods, Mich.

Application January 18, 1952, Serial No. 267,168

1 Claim. (Cl. 248—28)

This invention relates to chalkboards, also formerly called blackboards, and in particular, to adjustable mounts for such chalkboards.

One object of this invention is to provide an adjustable mounting for a chalkboard whereby the chalkboard may be quickly and easily raised or lowered and held firmly in its adjusted position in order to adapt it to users, such as children, of different heights.

Another object is to provide an adjustable mounting for a chalkboard of the foregoing character wherein the adjustment may be made without the need for special tools and without requiring the services of skilled persons.

Another object is to provide an adjustable mounting for a chalkboard of the foregoing character wherein the adjustable mount also has provision for guiding the chalkboard in its motion upward or downward so as to prevent it from moving sidewise or obliquely;

Another object is to provide an adjustable mounting for a chalkboard wherein the mount includes apertured channel members cooperating with bracket members having lugs projecting into the apertures in the channel members, the channel members being preferably mounted on the chalkboard in order to strengthen the chalkboard and prevent its warping.

Other objects and advantages of the invention will become apparent from the following description of the accompanying drawings, wherein:

Figure 1 is a front elevation of a chalkboard equipped with an adjustable mount, according to one form of the invention, with a portion of the chalkboard broken away to reveal certain of the adjusting and supporting members;

Figure 2 is a top plan view of the chalkboard and its adjustable mount shown in Figure 1;

Figure 3 is a right-hand side elevation of the chalkboard and adjustable mount shown in Figures 1 and 2;

Figure 4 is an enlarged central vertical section taken along the line 4—4 in Figure 1;

Figure 5 is a horizontal section taken along the line 5—5 in Figure 1;

Figure 6 is an enlarged fragmentary front perspective view of the upper portion of one of the channel members of the mounting; and Figure 7 is an enlarged rear perspective view of one of the bracket members associated with the channel member of Figure 6.

In schools and other institutions or establishments using chalkboards or blackboards, as they were formerly called, it has been found advisable to provide means for adjusting the chalkboards upward or downward in order to adapt them to different ages and therefore different heights of users. Such an adjustment for the chalkboard enables a given classroom to be used, either for tiny children or for older youth. Hitherto, however, the adjustable chalkboards available on the market have either required the use of special tools or skilled persons, or both, in order to enable the chalkboard to be adjusted upward or downward, and such adjustment has also required considerable time and care.

The present invention provides an adjustable mounting for a chalkboard whereby the chalkboard can be adjusted upward or downward instantly by a teacher or other responsible person without the need either for any tools or for calling upon the services of a janitor or other skilled technician. Moreover, the adjustment may be made quickly and conveniently without the possibility of getting the chalkboard out of alignment and, when once adjusted, the chalkboard will remain in adjustment and cannot shift its position accidentally. Furthermore, the adjustable mount is of simple construction which can be manufactured at a low cost and which also serves the purpose of strengthening the chalkboard and preventing warping thereof.

Referring to the drawings in detail, Figure 1 shows a chalkboard installation, generally designated 10, according to one form of the invention, as including a chalkboard, generally designated 11, and a mounting, generally designated 12, consisting of the two mounting units or mounts, generally designated 13. Each mounting unit or mount 13 further consists of a slotted channel member, generally designated 14, and one or more brackets, generally designated 15, co-operating with the slotted channel member or mounting member 14.

The chalkboard 11 is of conventional construction and may be either single-sided or reversible, the details of the chalkboard being outside the scope of the present invention. As shown, the chalkboard includes a writing or display panel 16 of any suitable material capable either of receiving the impressions from a piece of chalk or for other use such as bulletin or display purposes, capable of receiving thumb tacks, in which latter case it is commonly known in the building industry as a cork board. In either case, the writing or display panel is surrounded by a frame 17 and backed up by a backing panel 18 (Figures 4 and 5) of plywood or other suitable material. A chalk molding or trough 19 is secured to and extends along the bottom of the chalkboard 11 in order to receive pieces of chalk, erasers, pointers and the like.

Secured as by the fasteners 20 to the backing panel 18 of the chalkboard 11 in spaced parallel relationship are two of the channel members 14 (Figure 1), these channel members having longitudinal edge flanges 21 for this purpose (Figure 6). Extending perpendicularly from the flanges 21 are the side portions 22 of the channel member 14, these being connected to one another by the bottom portion 23. The bottom portion 23 is provided at suitable intervals, for example every three inches, with horizontal apertures or slots 24. The separation of the slots 24 depends upon the fineness of adjustment desired or the intervals between adjustments. The apertures 24 are easily punched in the channel members 14 by means of an ordinary punch press. The channel members 14 also serve to strengthen the chalkboard 11 and prevent warping thereof.

Co-operating with the channel members 14 and secured to battens or other vertical supports 25 on the wall 26 of the room are vertically-spaced pairs of the brackets 15 (Figure 7). Each bracket 15 consists of a stamping having a base plate or base portion 30 which is drilled for fasteners and which has centrally disposed supporting lugs or tongues 31 arranged in vertically spaced pairs and struck outward from the base plate 30 so that they project upward at an oblique angle to the base plate 30 (Figure 4). Also struck outward from the sides of the base plate 30 are parallel vertical guide lugs or flanges 32 which are spaced apart from one another a sufficient distance to receive the projecting portion 22, 23 of each channel member 14 between them (Figure 5). In this manner, the channel members 14 are guided in their vertical adjustment so that they cannot be accidentally tilted or otherwise displaced when the adjustment is made by inexperienced persons.

In the operation of the invention, let it be assumed that the bracket members 15 have been secured to their supports or battens 25 in vertically-spaced relationship and the supports 25 secured to the wall 26; also that the channel members 14 have been secured to the backing panel 18 in the same laterally-spaced relationship as the bracket members 15 so that the projecting portions 22, 23 of the channel members 14 slide freely up and down in the spaces between the guide lugs 32 of the brackets 15 (Figure 5). To alter the adjustment of the chalkboard upward, the teacher or other person merely grasps the bottom or sides of the chalkboard 11 and pushes upward, causing the slots 24 to move out of engagement with the inclined supporting lugs 31 (Figure 4), so that the chalkboard as a whole may be moved freely upward. When it has been raised to the desired height, the chalkboard 11 is lowered gently until the bracket lugs 31 enter the nearest pairs of channel member slots 24, the upper edges 27 of which come to rest on top of the lugs 31 in the manner shown in Figures 1 and 4. Due to the inclination of the lugs 31, the weight of the chalkboard causes the edge portions 27 of the channel members 14 to be jammed firmly between the lugs 31 and the base plate 30 of each bracket 15, making accidental dislodgment difficult or almost impossible. In order to prevent undesired or unauthorized adjustment, a suitable lock or latch (not shown) may be provided.

It will, of course, be evident that the bracket members 15 may be mounted on the back of the chalkboard and the channel members 14 mounted on the wall, thereby reversing the arrangement shown in the drawings.

What I claim is:

An adjustable mounting device for supporting a chalkboard structure on a wall structure, said device comprising an elongated channel member with a central web having a multiplicity of vertically-spaced slots therein and with spaced opposite parallel sides having lateral flanges along the opposite edges thereof adapted to be secured to one of said structures; and a bracket member having a base plate adapted to be secured to the other structure, said bracket member having upper and lower flat portions connected by a flat central portion with upwardly-inclined struck-up tongues projecting upwardly and forwardly therefrom into registry with said slots, said bracket member also having laterally-spaced parallel vertical guide wings on opposite sides of said central portion and bent outwardly therefrom and separated laterally from one another by substantially the width of the channel of said channel member and projecting forwardly from said base plate into close proximity to the opposite sides of the channel of said channel member in interfitting and interlocking sliding relationship therewith.

References Cited in the file of this patent

UNITED STATES PATENTS

| | | |
|---|---|---|
| 123,457 | Cowdery | Feb. 6, 1872 |
| 604,422 | Schneider | May 24, 1898 |
| 689,539 | Collins | Dec. 24, 1901 |
| 728,653 | Anthony | May 19, 1903 |
| 861,142 | Rynek | July 23, 1907 |
| 1,504,523 | Sherer | Aug. 12, 1924 |
| 1,702,937 | Friedemann | Feb. 19, 1929 |
| 1,912,096 | Reuter | May 30, 1933 |

FOREIGN PATENTS

| | | |
|---|---|---|
| 8,659 | Great Britain | of 1897 |
| 588,686 | Great Britain | of 1947 |